United States Patent Office 2,994,755
Patented Aug. 1, 1961

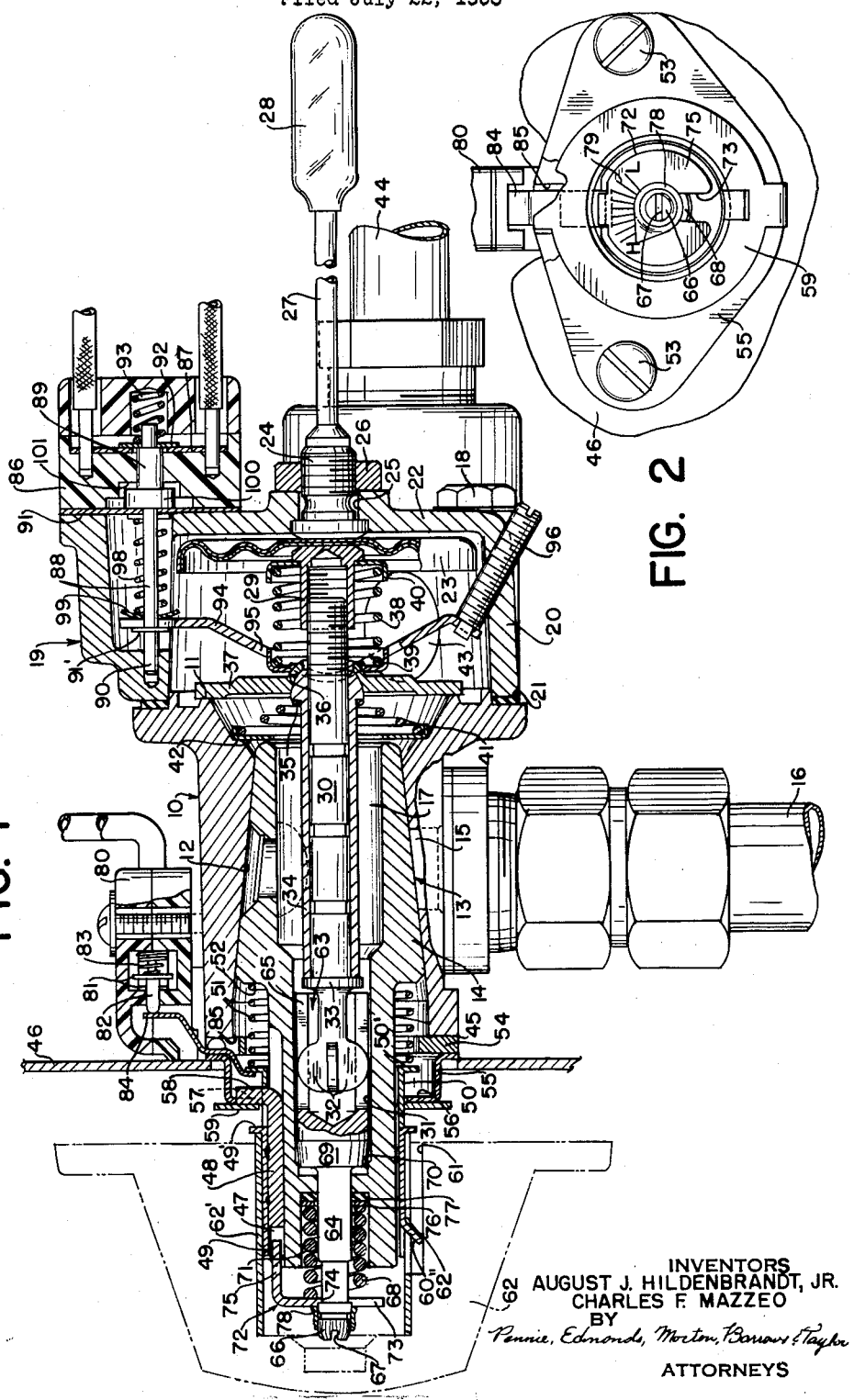

2,994,755
GAS OVEN CONTROL
August J. Hildenbrandt, Jr., and Charles F. Mazzeo, Scotch Plains, N.J., assignors to The Wilcolator Company, Elizabeth, N.J., a corporation of Delaware
Filed July 22, 1958, Ser. No. 750,231
18 Claims. (Cl. 200—140)

The present invention relates to thermostatic control devices, and has specific reference to thermostatic devices for controlling gas ovens and the like, the foregoing being illustrative, however, and not a limitation. One of the most advantageous uses of the invention is in thermostatic gas oven controls, for accurately regulating the flow of gaseous fuel to an oven burner and/or for indicating oven conditions, such as whether the oven burner is on and/or whether the oven is up to temperature.

One of the specific features of the invention resides in the provision, in a temperature responsive device for controlling the flow of fuel to an oven, of ambient temperature compensation means operative to counteract, at least substantially, any tendency for the gas flow valve to open or close in response to ambient temperature conditions, as distinguished from operating conditions within the oven. Thus, conventional temperature responsive control devices of the type herein concerned employ valve actuating means operable under the influence of a thermally expandable or contractable liquid to move a valve member toward or away from a valve seat. A bulb, filled with the liquid, is placed in the area where temperature is to be measured or regulated and is connected to an expandable bellows or like device by means of a capillary tube. Ideally, the volume of liquid within the capillary tube and bellows is so small that ambient temperature conditions about the capillary and bellows have no appreciable effect upon the actuation of the valve member. However, in practice, such ambient temperature conditions have a noticeable effect upon valve actuation, to the end that an error may be introduced. Accordingly, the present invention provides a novel valve structure, in which certain elements, connecting the valve actuator to one or both of the valve and valve seat members, expand or contract in opposition to the expansion or contraction of the actuator induced by ambient temperature conditions. The arrangement is such that ambient temperature conditions may vary widely without substantial effect upon the valve setting as determined by operating temperatures in the area subject to control.

Another specific feature of the invention resides in the provision, in a thermostatic control device of the type having a selectively operable manipulator for adjusting the device to maintain an area at a predetermined temperature, of novel and greatly improved arrangements for effecting calibrating adjustments between the manipulating means and the control member or members adjusted thereby. This aspect of the invention is particularly applicable to gas oven controls, in which a valve member is connected to an actuating bellows by a threaded control member, which may be rotated by manipulating means to set the valve member in a predetermined, initial position with respect to a valve seat. In such valves, it is conventional to provide for a rotary, calibrating adjustment between the control member and the manipulating means whereby, when the manipulating means is set in a predetermined position, such as indicated by a dial, the control member may be rotated, relative to the manipulating means, to set the valve in a position to correspond with the setting of the manipulating means. The calibrating adjustment, which is normally made as part of the manufacturing procedure, has heretofore occasioned substantial manual labor and correspondingly increased expense by reason of the provision of complicated means, heretofore thought to be necessary, for locking the manipulating means and control member in preadjusted relation. In the device of the present invention, however, the calibrating adjustment may be carried out in a greatly facilitated manner, and by automatic means, by reason of a construction which eliminates the complicated locking arrangements of prior designs.

Additional specific features of the invention reside in the provision, in a thermostatic control device, such as a gas oven control, of novel and simplified "oven-on" and "oven-ready" signal means whereby a user of the control can readily ascertain whether or not an oven is turned on and, if so, whether or not the oven is at or near the desired, preset temperature. In most gas oven controls, the oven is turned on by pressing inwardly on and rotating a control knob and, in the device of the present invention, a novel and simplified arrangement is provided whereby inward movement of the knob effects actuation of a switch for energizing an "oven-on" indicator, such as a signal light. The device of the invention also includes a novel and simplified mechanism, actuated by the main gas flow control valve, for effecting closure of a switch in response to movement of the valve to a closed or substantially closed position, as in response to the heating of an oven substantially to a pre-set temperature.

For a further discussion of the above and other novel and advantageous features of the invention, reference should be made to the following detailed description and to the accompanying drawing, in which:

FIG. 1 is a longitudinal, cross-sectional view of a gas oven thermostatic control incorporating the several features of the invention; and FIG. 2 is a fragmentary front elevation of the device of FIG. 1, with the control knob or manipulator removed.

Referring now to the drawing, the numeral 10 designates a main valve housing, which may be formed of a material such as aluminum and has a machined portion 11 at its forward end forming an annular valve seat. The housing part 10 has a tapered bore 12 extending therethrough and receiving a rotatable main valve member 13, to be described in greater detail, which has a forward portion 14 in the form of a tapered plug. A gas inlet 15 is connected to a suitable source 16 and leads through the housing wall, into the tapered bore 12, in the usual manner, whereby gas may flow into an internal axial recess 17 in the main valve member, when the latter is in a proper rotary position.

Mounted on the inner end of the main housing part 10, as by means of suitable bolts 18, is a housing part 19, which may be referred to as a chamber housing. The housing part 19 has side walls 20 extending toward and sealingly engaged with the forward end of the main housing 10, a suitable gasket 21 being interposed, and a front wall 22 which is spaced a substantial distance (e.g., one-half inch) from the valve seat 11. In accordance with one aspect of the invention and for reasons to be explained further, the chamber housing 19 is advantageously formed of aluminum or of a material having thermal expansion properties characteristic of a material such as aluminum. Such a material may be referred to herein as "high expanding," meaning that its temperature co-efficient of expansion or contraction is relatively large. Aluminum, for example, has a linear co-efficient of thermal expansion at 70° F. of about $13 \times 10^{-6}$.

Mounted rigidly on the wall 22 of the chamber housing is a bellows 23 of a type conventionally used in gas oven controls. The bellows is mounted by means of a fitting 24 which extends through an opening 25 in the housing wall and has a threaded end engaged by a nut 26. The fitting 24 connects with a capillary tube 27 leading to a bulb 28 filled with a thermally expandable liquid.

The bulb 28 is arranged to be positioned in an area to be regulated, such as the interior of an oven.

Secured to and extending forwardly from the front and movable portion of the bellows 23 is a connector 29 which threadedly engages a control rod or member 30. The member 30 extends forwardly, beyond the valve seat 11, through the main recess 17 and into a secondary recess 31 of the rotatable valve member 13. The extreme forward end of the control member is provided with radial arms 32, and spaced inward from the arms 32 is a flange 33 forming an abutment or shoulder. In accordance with one aspect of the invention and for reasons to be further described, the control member 30 is formed of steel or a material having thermal expansion properties characteristic of a material such as steel. Such a material may be referred to as "low expanding," meaning that its co-efficient of thermal expansion is relatively low. Steel, for example, has a linear co-efficient of thermal expansion at 70° F. of about $6 \times 10^{-6}$.

Received slidably over the control member 30 and seated at its forward end against the shoulder 33 is a sleeve 34 formed of aluminum or other high-expanding material. At its inner end, the sleeve 34 has an enlarged head forming a forwardly facing shoulder 35 and a spherically contoured end surface 36. A disc-like valve member 37 is seated on the spherical end of the sleeve 34 and is adapted for limited universal movement with respect thereto. The diameter of the valve disc is such that the edges thereof extend radially beyond the annular valve seat 11, providing a flat valve surface adapted for sealing engagement with the seat 11. The valve disc 37 is urged continuously (when not seated on valve seat 11) into tight, sealing engagement with the sleeve 34 by a spring 38 seated in cups 39, 40 engaging the valve disc 37 and connecting member 29 respectively. A conical spring 41 seats against the shoulder 35 of the sleeve and against a ring 42 supported in the main housing part 10, the spring 41 acting in opposition to the spring 38 (but being inferior thereto in strength) and maintaining tight sealing engagement between sleeve 34 and disc 37 when the latter is seated on valve seat 11.

The valve disc 37, in conjunction with the annular seat 11, forms the control valve of the assembly and is adapted for actuation in accordance with the temperature of the liquid in the bulb 28. The disc 37, illustrated in the closed position, may be opened by rotation of the control member 30 in a direction to advance the member in the threaded connector 29, toward the bellows 23. Assuming the main valve 13 to be opened, gas may flow from the source 16, through the recess 17, into the valve chamber formed by the housing 19, and out of the chamber through an opening 43 therein and through an outlet line 44 to a burner (not shown). As the liquid in the bulb 28 becomes heated, it expands and causes expansion of the bellows 23. The valve disc 37 is thus moved forwardly, toward the valve seat 11, to reduce the flow of gas to the burner.

In accordance with one important aspect of the invention, ambient temperature conditions surrounding the valve assembly are substantially compensated for by the judicious selection of materials forming the chamber housing 19, control member 30 and sleeve 34. Thus, assuming the valve to be initially opened to a pre-set position, and a burner controlled thereby to be in operation, expanded fluid from the bulb 28 is directed into the bellows 23, expanding the bellows and tending to close the valve. The volume of such liquid is small and, ideally, the temperature of the liquid in the bellows is without substantial effect on the operation of the control valve 37. However, in practice, when the valve parts become heated, as by reason of their proximity to the oven or other heated chamber, the control valve 37 may tend to close prematurely, due to the additive effect of expansion of the liquid in the bellows and in the adjacent portions of the capillary 27 induced by ambient temperature conditions. The magnitude of the ambient temperature effect may vary substantially, depending upon a variety of factors, such as length of operation of the oven, environmental air temperature, etc., so that substantially inaccuracies may be introduced with conventional controls.

It will be observed that, in the illustrated apparatus, the effect of increasing ambient temperature conditions will be to tend to expand the bellows 23 and move the valve disc 37 toward a closed position. Such an effect is partially compensated for by the provision of a chamber housing 19 at least the wall portions 20 of which are formed of high-expanding material. Thus, as the bellows 23 tends to move the disc 37 toward the valve seat 11, the bellows 23 is bodily retracted from the valve seat through lengthwise expansion of the walls 20. The connection between the bellows 23 and the valve disc is, in effect at least, low expanding, so there results a net thermal expansion of the valve disc away from the valve seat 11, at least partially compensating for the forward movement of the valve caused by the ambient temperature expansion of the bellows.

In combination with the foregoing compensatory measures, the device of the present invention utilizes a sleeve 34 of high-expanding material received over the control member 30 formed of low expanding material. Thus, the total lengthwise expansion of the control member 30, under increasing ambient temperatures, is more than offset by the greater expansion, rearwardly from the shoulder 33, of the high-expanding sleeve. The net effect of the combined expansions of the control member 30 and sleeve 34 is to move the valve disc 37 toward the bellows 23.

In the illustrated device, the sleeve 34 may be of substantial length (e.g., in the order of 1 inch), with the effective portion of the control member 30 being only slightly longer, while the length of the walls 20 of the chamber housing may be on the order of one-half inch. Experience has demonstrated that the compensating expansion provided by members of such length substantially balances the ambient temperature-induced expansion of the bellows 23, so that the action of the control valve 37 is accurately related to the temperatures sensed by the bulb 28. Likewise, as will be readily understood, the described structure will provide compensation for contraction of the bellows 23 induced by reductions in ambient temperature conditions.

In the illustrated gas oven control, the rotary valve member 13 has a portion 45 which projects forwardly of the main housing part 10, such forward portion being exposed, in the complete installation, forwardly of a wall 46 of a stove, for example. The forward portion 45 is provided with a longitudinal groove or recess 47, in which is received an L-shaped key 48 fixed to a sleeve 49. The sleeve 49 extends inwardly, terminating in a flange 49'. Another sleeve member 50 is provided inwardly of sleeve 49, its outer end engaging flange 49' and its inner end being provided with a flange 50' extending radially outward from its longitudinal axis. The flange 50' forms an abutment surface for seating one end of a spring 51, the other end of the spring acting inwardly against a shoulder 52 formed by the enlarged forward portion 14 of the rotary valve 13.

Secured to the front face of the main housing 10, as by screws 53, are a spacer 54 and cap 55. The cap 55 has an abutment surface 56, facing inwardly, in which is formed a slot 57 for receiving a tab portion 58 of the key 48. In accordance with general practice, the tab 58 is adapted to be aligned with the slot 57 when the rotary position of the rotatable valve member 13 is such as to cut off entirely the flow of gas. The spring 51, acting upon the sleeve 49, urges the sleeve and key forward, at such times, so that the tab 58 enters the slot 57 to lock the sleeve against rotation.

To turn the valve on, the sleeves 49 and 50 must be pressed inward, whereupon the valve may be rotated to open a port between the supply line 16 and the recess 17. The tab 58, in any open position of the valve, is held inward by the surface 56 of the cap 55.

Advantageously, the sleeve 49 is provided with a tab 60 adapted for reception in a slot 61 of a manipulating knob or dial 62. The knob or dial 62 is provided with what may be termed a dial sleeve 62' which is received over the exposed portions of the sleeve 49 and is adapted to engage flange 49' thereof. The dial sleeve 62' is provided with a slot 62" to accommodate tab 60 and may be secured in the knob or dial 62 in any suitable manner (as by cementing) to prevent relative axial movement of it with the knob. Accordingly, when the knob is pressed inwardly and/or rotated, the sleeve 49 and key 48 move correspondingly, rotary motion being imparted through tab 60.

In accordance with one important feature of the invention, improved arrangements are provided for effecting a calibrating adjustment between the control member 30 and the rotary valve member 13 whereby when the knob 62, which is usually calibrated to indicate degrees of temperature, is rotated to a pre-set condition, the valve disc 37 is spaced an appropriate distance from the annular valve seat 11. Thus, when the knob 62 is set to a position indicating 400° F., for example, the disc 37 should be so spaced from the valve seat 11 as to provide for return movement of the valve disc substantially to a closed position, under the action of the bellows 23, when the temperature sensed by the bulb 28 is 400°. Such calibration is conventionally effected by rotating the valve member 13 and control member 30 simultaneously to a predetermined position and noting the setting of the valve disc 37. If the setting of the disc 37 does not correctly correspond with the predetermined position of the members 13, 30, the member 30 is rotated independently of the member 13 until the proper disc setting is reached. Such calibrating adjustment is normally part of the manufacturing procedure and usually is not altered thereafter, except by qualified servicemen.

In the device of the invention, the improved calibrating adjustment means comprises an adjusting member 63 received in the secondary recess 31 of the rotary valve member 13 and having a portion 64 of reduced diameter projecting forwardly of the recess and exposed at the outer end of the member 13. The adjusting member 63, in accordance with known general practice, is provided over its inner end portion with a plurality of longitudinal slots 65 for the reception of the arms 32 at the forward end of the control member 30. The slots 65 permit relative longitudinal movement between the control and adjusting members 30, 63, while preventing relative rotational movement between those members.

At its outer end, the adjusting member 63 is provided with a head portion 66, which advantageously has means, such as a screw-driver slot 67, facilitating engagement and rotation of the member. By holding the rotary valve member 13 in a fixed, pre-set position and rotating the adjusting member 63 the valve disc 37 may be advanced toward or away from the seat 11 to a position accurately corresponding with the pre-set rotary position of the member 13.

After a calibrating adjustment has been accomplished, it is important to lock the adjusting member 63 for rotation with the rotary member 13 in an effective and positive manner, whereby the calibrating adjustment is not altered throughout repeated operations of the valve device. To this end, known devices have been provided with complicated locking means, set following the calibrating adjustment. Such complicated arrangements have been believed necessary, heretofore, notwithstanding that substantial manual labor was required, and that the calibrating adjustment frequently was altered during setting of the locking means.

In accordance with the present invention, a substantially improved locking means is afforded by providing mutually gripping surfaces on the valve member 13 and adjusting member 63, which are continually urged into tight, gripping relation by resilient means, such as a spring 68. Thus, the forward end 69 of the body portion of the adjusting member is tapered slightly and is arranged for tight-fitting engagement with a reduced diameter portion 70 of the recess 31, which portion may also be tapered to correspond with the taper of the portion 69. The surfaces 69, 70 are urged into tight, frictionally gripping engagement by the spring 68, which is received in a recess 71 in the valve member 13 and acts against an L-shaped key 72. The key 72 has a slot 73, adapted to be received over the forward portion of the adjusting member, and a shoulder 74 adapted to engage the enlarged end portion 66 of the adjusting member. A portion 75 of the key extends longitudinally into the recess 47 in the valve member 13, so that the key rotates with the main valve member. The inner end of the spring 68 seats against a washer 76, which is applied over a resilient washer 77 forming a seal between the valve member 13 and the adjusting member 63.

The spring 68, acting outwardly upon the adjusting member 63, maintains the member in effectively positively gripped relation to the main valve member 13, through the frictional engagement between the surfaces 69, 70. Accordingly, during normal operation of the valve, the rotary valve member 13 and the control member 30 are rotated as a single unit, by manipulation of the knob 62. However, calibrating adjustments may be readily accomplished by engaging the adjusting member 63 with a tool, such as a screw-driver, and applying sufficient torque to overcome the otherwise effectively positive gripping action of the surfaces 69, 70. And, where necessary or desirable, some inward pressure may be applied to the adjusting member 63 to reduce the gripping action of the last mentioned surfaces.

The extent of the calibration thus effected may be determined visually by providing a pointer 78, which is crimped to the outer end of the adjusting member 63. Appropriate calibration marks 79 provided on the L-shaped key 72 permit a serviceman, for example, to observe the magnitude of the calibrating adjustment.

The improved calibrating adjustments thus described represent a substantial advance in the design of temperature responsive control devices, such as oven controls, in that they greatly facilitate the carrying out of the calibrating adjustment by eliminating entirely the operation, formerly thought necessary, of locking the adjusting member with set-screws or like devices. Of perhaps greater importance, calibration of controls incorporating the improved arrangements may be carried out on an automated basis, with relatively simplified automatic calibrating machines.

As another specific feature of the invention, the improved control is provided with a novel and simplified arrangement, of a purely mechanical nature, for closing switch contacts when the main valve 13 is turned on, whereby a user of the device may be apprised, as by a warning light or signal, that the device is in use. Such signal devices, which are not new in the broad sense, are frequently known as "oven-on" signals.

In the illustrated device, a switch 80 is mounted on the main valve housing 10 and is provided with switch contacts 81 arranged to be closed by forward movement of a plunger 82 under the action of a spring 83. An actuating lever 84, which may be a simple, metal stamping, extends through an opening 85 in the spacer 54 and has portions projecting into the housing of the switch 80 and also into the interior of the front cap 55. The upper end portion of the lever 84 bears against the forward end of the plunger 82, while the lower end of the lever is engaged by the forward face of the flange 50 on the inner end of the sleeve 49.

When the main valve 13 is in the off position, with the key tab 58 received in the slot 57, the flange 50 is moved to its forwardmost position, causing the actuating lever 84 to be rocked in a clockwise position. Accordingly, the plunger 82 is pressed inwardly and the contacts 81 are open. When the sleeve 49 is pressed inward, as when the main valve is turned on, the actuating lever 84 is permitted to pivot in a counterclockwise direction, under the influence of the switch spring 83. This permits the contacts 81 to close, completing an appropriate circuit (not specifically illustrated) including a suitable signal device, usually a warning light.

The improved oven-on control is advantageous by reason of its overall simplicity and its adaptability to control devices of otherwise standardized form. Thus, the main housing 10 may be the same, whether or not a particular valve device incorporates an oven-on signal. When the oven-on signal is used, the spacer 54 is added, or is substituted for an ordinary spacer, to provide an opening through which the switch acuating lever 84 may project, and the other parts of the structure may be substantially the same as when the signal is omitted.

Another specific feature of the invention resides in the provision of a novel and simplified signal device, generally known as an "oven-ready" signal for indicating when an oven, for example, is up to the predetermined temperature determined by the setting of the knob 62. The improved signal device comprises a switch 86 mounted on the chamber housing 19 and having contacts 87 adapted, when closed, to complete a circuit to a suitable signal device, such as a light (not shown).

Advantageously, the switch 86 includes an actuating plunger 88 having an enlarged shoulder 100 which engages an insulator button 89 slidably received in the switch housing. A portion 90 at the other end of plunger 88 is slidably received in the chamber housing 19. A diaphragm 91, interposed between the switch casing and the chamber housing 19 and compressed between shoulder 100 of plunger 88 and a washer 91' around the main portion of plunger 88, seals off the valve chamber from the interior of the switch. At its inner end, the plunger 88 carries a contact member 92, which is arranged to bridge the switch contacts 87, when the plunger is in its forward position, a spring 93 being provided to urge the plunger to such position.

For operating the switch 86, there is provided an actuating lever 94, in the form of a yoke, which is received in the valve chamber and has a central opening 95 through which the control member 30 extends. At its lower end, the actuating lever 94 has a small hole, in which is received the end portion of an adjusting screw 96, which extends through the chamber housing 19 and is disposed at an angle of 30 or 40° with respect to the axis of the control member 30. The adjusting screw 96 supports the lower end of the lever 94 for movement in a generally forward or generally rearward direction.

In the illustrated device, the actuating lever 94 is somewhat in the shape of a flat V, apex portions of which bear against the valve disc 37 on opposite sides of the control member 30. The upper end of the lever is slotted to receive the plunger 88 and is held against a flange 97 on the plunger by a spring 98 acting against a curved washer 99.

When the valve device is turned on, as by rotating the control member 30 to move the valve disc 37 inward from the seat 11, the valve disc presses inward upon the actuating lever 94, causing it to pivot about the end of the supporting screw 96. The lever 94 thus presses inward upon the plunger 88, through the intermediary of the spring 98. The spring 98 is of greater strength than the spring 93, so that inward movement of the lever 94 causes the plunger 88 to be moved inward to open the contact 87. Overtravel of the lever 94, after a shoulder 100 on the plunger 88 engages an abutment 101 on the switch casing, is provided by compression in the heavier spring 98.

As the oven or other heating unit gradually warms up to the pre-set temperature, the valve disc 37 is moved progressively forward by expansion of the bellows 23. Accordingly, the actuating lever 94 pivots in a counterclockwise direction until, when the oven is substantially at the desired temperature, the plunger 88 is moved sufficiently forward to close the contacts 87 and complete the circuit to the signal light or other device.

Calibrating adjustment of the signal may be effected by rotation of the adjusting screw 96, until the closing of the switch contacts coincides in the desired manner with the forward movement of the valve disc 37.

It will be understood, of course, that the specific device herein illustrated and described is intended to be representative only, as certain changes may be made therein without departing from the clear teachings of the disclosure. Accordingly, reference should be made to the following appended claims in determining the full scope of the invention.

We claim:

1. In a thermostatic control device of the type having a housing, a valve seat in said housing, a valve member within said housing, a temperature responsive actuator for moving said valve member toward and away from said valve seat, a control member threadedly interconnecting said valve member and actuator and rotatable for setting said valve member at predetermined initial distances from said valve seat, and selectively operable manipulating means for rotating said control member, improved calibrating means for adjusting the relative rotary positions of said control member and manipulating means comprising a rotatable member received in said housing and forming part of said manipulating means, an adjusting member carried by said rotatable member and serving to interconnect said control member and said manipulating means, said adjusting member having a portion exposed exteriorly of said rotatable member and adapted to be engaged to effect rotary movement of said adjustable member with respect to said rotatable member, means forming gripping surfaces between said adjusting and rotatable members, and resilient means tending to maintain said gripping surfaces in constant gripping contact.

2. The thermostatic control device of claim 1, in which said rotatable member has an inwardly opening recess, said adjustable member is received in said recess, and a spring urges said adjusting member in an outward direction tending to maintain surfaces of said adjusting and rotatable members in frictional contact.

3. The thermostatic control device of claim 2, in which the exposed portion of said adjustable member is of reduced diameter and extends through an opening in the outer end of said recess, a resilient sealing washer is received over said exposed portion and engaged with an outer wall of said rotatable member, and said spring acts outwardly on said exposed portion and inwardly against said washer.

4. The thermostatic control device of claim 1, in which said adjusting member has a generally cylindrical body portion and is received in a generally cylindrical recess in said rotatable member, a tapered surface portion is provided on at least one of the body portion and recess, and said gripping surfaces are formed, at least in part, by said tapered surface portion.

5. A thermostatic control device for gas ovens and the like, comprising a housing, a rotatable valve member received in said housing and projecting forwardly thereof, a control member received slidably on the forward portion of said valve member and rotatable therewith, means urging the control member in a first direction toward a limit position, means for holding said control member in a second position away from said limit position when said control member is moved in a second direction and rotated to any position within a predetermined range, and a switch actuated by sliding movement of said control member to said second position and held in actuated condition by said control member throughout all rotary positions thereof within said predetermined range.

6. The thermostatic control device of claim 5, in which said control member is a sleeve received over an outer end portion of said rotatable member, said sleeve has a radial flange, a switch actuating element is positioned adjacent said flange and adapted to be moved upon sliding movement of said sleeve to said second position.

7. The thermostatic control device of claim 6, in which the urging means comprises a spring acting on the inner face of said flange, and said actuating element is engaged by the outer face of said flange and adapted to be moved outwardly by said flange.

8. The thermostatic control device of claim 6, in which said switch is mounted on the exterior of said housing, and said actuating element projects into said housing for engagement by said flange.

9. The thermostatic control device of claim 8, in which said actuating element is a lever pivoted on said housing.

10. A thermostatic control device for controlling the operating temperature of an oven or the like, comprising means forming a valve seat, a valve member movable toward and away from said seat, a temperature sensitive actuator for actuating said valve member, and ambient temperature compensation means interconnecting said valve member with said actuator, said compensation means being dimensionally changeable with ambient temeprature to tend to move said valve member and valve seat relatively toward or away from each other in opposition to the actuation of said member and seat by said actuator in accordance with changes in ambient temperature, said compensation means comprising mounting means extending from said actuator toward said valve seat for mounting said valve member, said actuator tending to move said valve member toward said valve seat upon an increase in ambient temperature, said mounting means comprising a first member of relatively low-expanding material extending from said actuator toward and beyond said valve member and valve seat, said valve member being movably mounted on said first member, and a second member formed of relatively high-expanding material and extending from the the free end of said first member toward said actuator, said valve member being engaged by said second member and being movable with respect to said first member in accordance with differential expansions and contractions of said first and second members.

11. The thermostatic control device of claim 10, in which said first member is a rod formed of material having thermal expansion properties characteristic of steel, and said second member is formed of material having thermal expansion properties characteristic of aluminum.

12. A thermostatic control device comprising an actuator, a temperature sensing element located remotely of said actuator for effecting expansion and contraction thereof, said actuator being subject to limited expansion and contraction with changes in ambient temperature, a valve, and means interconnecting said valve and actuator for effecting opening and closing of said valve in accordance with expansion and contraction of said actuator, the interconnecting means including an element arranged to expand or contract with changes in ambient temperature in opposition to expansions and contractions of said actuator induced by changes in ambient temperature, said valve including a valve member movable toward a valve seat in accordance with expansions of said actuator, and said interconnecting means including means tending to separate said valve seat from said actuator and tending to close the space between said valve member and said actuator with increases in ambient temperature.

13. A thermostatic control device for gas ovens and the like, comprising a housing forming a chamber, a valve member in said chamber movable toward and away from a valve seat, an actuator for moving said valve member in accordance with temperature conditions in a controlled area, a switch mounted on said housing, a switch actuating element connected to said valve member and adapted to effect actuation of said switch upon movements of said valve member toward and away from said valve seat, said switch being mounted at one side of said housing, said actuating element comprising a lever pivoted at the opposite side of said housing, and means for adjusting the pivot point of said lever.

14. A thermostatic control valve for regulating gas ovens and the like, comprising a housing having a valve seat, a valve element movable toward and away from said seat, a valve actuator mounted in said housing behind the valve element, a rod connected to said actuator and extending through and forward of said valve element, said rod element being threadedly connected to said actuator for regulation of the valve, means on said rod and in front of said valve element forming a shoulder, and a tubular element received over said rod, against said shoulder, and extending rearward to engage said valve element, said rod being formed of low-expanding material and said tubular element being formed of high-expanding material.

15. A thermostatic control device for gas ovens and the like, comprising a housing forming a chamber and having a valve seat, a valve member movable toward and away from said valve seat, a rod-like member extending through and supporting said valve member and movable along its axis for opening and closing said valve member, an actuator for moving said rod-like member and said valve member in accordance with temperature conditions in a controlled area, a switch mounted on said housing and having an actuating element accessible from within the housing, said actuating element being located in offset relation to said rod-like member at one side thereof, a switch operating lever mounted for pivotal movement within said housing about an axis offset from said rod-like member on the other side thereof, said lever extending across said housing to engage said actuating element and engaging said valve member in the region thereof adjacent said rod-like member, and means adjustable from the exterior of said housing and forming a movable pivot support for said lever.

16. The thermostatic control device of claim 15, in which the switch operating lever has an opening in its center portion through which said rod-like element extends, and portions of the lever bear upon said valve member on opposite sides of said rod-like member.

17. The thermostatic control device of claim 15, in which the pivot support for said switch operating lever comprises a screw extending through a wall of said housing and having a shouldered end within said housing for receiving and supporting said lever.

18. The thermostatic control device of claim 15, in which a spring is interposed between said actuating element and said lever, whereby said lever acts through said spring to move said actuating element, said spring accommodating overtravel movements of said lever.

References Cited in the file of this patent

UNITED STATES PATENTS

| | | |
|---|---|---|
| 2,331,464 | Fillo | Oct. 12, 1943 |
| 2,395,007 | Leupold | Feb. 19, 1946 |
| 2,487,213 | Bender | Nov. 8, 1949 |
| 2,800,283 | Weber et al. | July 23, 1957 |